H. S. Poole
Button.
Nº 2219. Fig. 1.    Patented Aug. 11. 1841.
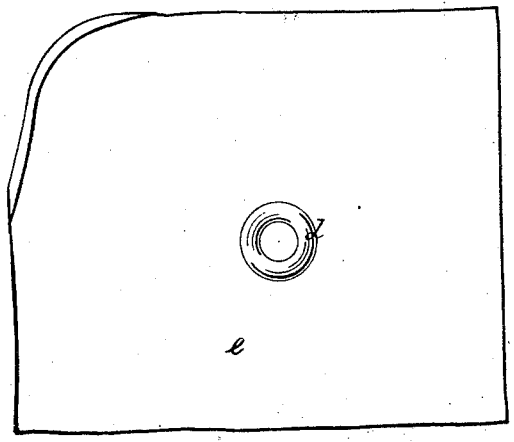
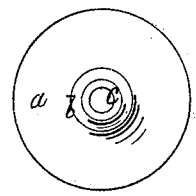
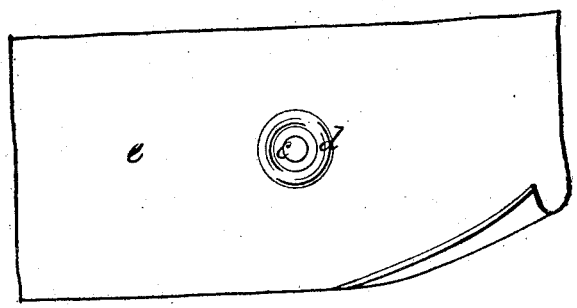
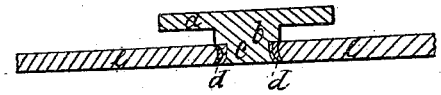
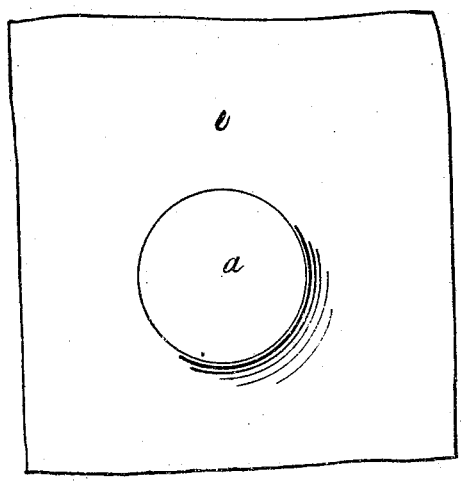

UNITED STATES PATENT OFFICE.

HENRY S. POOLE, OF BOSTON, MASSACHUSETTS.

MODE OF ATTACHING BUTTONS TO CLOTH.

Specification of Letters Patent No. 2,219, dated August 11, 1841.

*To all whom it may concern:*

Be it known that I, HENRY S. POOLE, of Boston, in the county of Suffolk and State of Massachusetts, have invented a new and Improved Method of Attaching Buttons to Garments, of which the following is a true and exact description.

My improvement is adapted to metallic buttons or those of other materials, and to those in form of a circular plate or of an oval, globular or other form—the improvement being confined to the shank or mode of attaching the button to the cloth or other fabric on which it is to be used. The shank may also be of metal or any other material, though I usually make it of metal. The rivet projecting from the shank is of malleable metal. I attach the common eyelet to the cloth at the point where the button is to be attached. The eyelet is in common use for lacing, but has not, to my knowledge, been heretofore applied in combination with the button. The mode of attaching the eyelet to the cloth or other fabric is well known and familiar in practice and needs not to be described. I use an eyelet of metal or other material of sufficient firmness and strength to rivet to. At the extremity of the shank and commencement of the rivet, where the two are united, I make a shoulder, projection, circular rim or flanch to serve for a bearing upon the eyelet.

The rivet thus standing out beyond the shoulder, rim, or flanch, at the termination of the button shank, must be of a suitable size, length and shape to fit into the eyelet hole of the eyelet and pass through it, so as to admit of a slight head or clench being formed on the end of the rivet most distant from the button. I usually make the end of the rivet slightly dished or cup-shaped so that when the rivet is inserted through the eyelet, a clench or slight head may be easily made by the blow of a hammer directly on the end of the rivet or on a punch applied to the end of the rivet. Thus the button is held firmly to the eyelet by the shoulder on one side next the button and on the other side by the clench or head formed as above described. When the shank of the button and the rivet are of the same malleable metal and in fact make one piece, the shank part may be a little larger than the rivet part projecting from it, so as to make a shoulder at the termination of the shank part where the rivet part commences: and this is the form in which I usually make my buttons. But the shank may be of a different material from the rivet and attached to the rivet in any way the manufacturer may choose; it being necessary, however to have a head, flanch, shoulder, or swell on the rivet or shank at the extremity of the rivet toward the button, that is, where it is attached to or connected with the shank. The mode of attaching, connecting, fastening or combining the shank and rivet together is not claimed as part of my improvement.

I claim as my improvement and ask a patent for—

The mode of fastening the button to the cloth by means of a metallic rivet attached to the shank of the button and fastened on a metallic or other eyelet as herein set forth.

In testimony whereof, I, the said HENRY S. POOLE hereto subscribe my name in the presence of the witnesses whose names are hereto subscribed, on the twenty-seventh day of July A. D. 1841.

HENRY S. POOLE.

Witnesses:
RICHD. ROBINS,
WM. A. CRAFTS.